United States Patent [19]

Walton

[11] Patent Number: 4,782,342

[45] Date of Patent: Nov. 1, 1988

[54] PROXIMITY IDENTIFICATION SYSTEM WITH LATERAL FLUX PATHS

[76] Inventor: Charles A. Walton, 19115 Overlook Rd., Los Gatos, Calif. 95030

[21] Appl. No.: 892,120

[22] Filed: Aug. 4, 1986

[51] Int. Cl.$^4$ .............................................. G08G 1/01
[52] U.S. Cl. ................................... 340/941; 340/933; 340/572; 340/825.3; 235/380; 336/129
[58] Field of Search ............ 340/941, 572, 561, 552, 340/553, 573, 825.31, 825.34, 933, 825.3; 235/380, 439; 336/75, 115, 121, 125, 123, 124, 129

[56] References Cited

U.S. PATENT DOCUMENTS

| | | | |
|---|---|---|---|
| 4,123,749 | 10/1978 | Hartmann et al. | 340/572 |
| 4,151,405 | 4/1979 | Peterson | 340/572 |
| 4,215,342 | 7/1980 | Horowitz | 340/572 |
| 4,308,530 | 12/1981 | Kip et al. | 340/572 |
| 4,459,474 | 7/1984 | Walton | 235/380 |
| 4,623,877 | 11/1986 | Buckens et al. | 340/572 |

Primary Examiner—Donnie L. Crosland
Attorney, Agent, or Firm—Thomas E. Schatzel

[57] ABSTRACT

An electrical proximity identification system which has lateral flux. The system has a reader section with a reader antenna which is comprised of a pair of coils. The coils are located in the same plane and are oriented such that when they are energized by radio frequency power, the flux lines travel between the coils in a direction parallel to, but above and below, said plane. The system also has an identifier section with an identifier antenna. The identifier antenna is positioned such that its axis is parallel to the plane and in line with the flux lines.

28 Claims, 6 Drawing Sheets

Fig_1 PRIOR ART

Fig_2

Fig_3

Fig_4

Fig_5

Fig_6

Fig_7

Fig_8

Fig_9

Fig_10

Fig_11

TO READER CIRCUIT   TO GROUND

Fig_12

Fig_13

Fig_14

Fig_15

PROXIMITY IDENTIFICATION SYSTEM WITH LATERAL FLUX PATHS

BACKGROUND OF THE INVENTION

1. Field of the Invention

This invention relates generally to electronic identification and recognition systems and more specifically to such systems wherein it is not necessary to make physical contact between the identification section and the reader section.

2. Description of the Prior Art

There are various electronic identification and recognition systems wherein the identifying device is portable. Sometimes the identifying device is referred to as a "card", "tag", "key" or the like. The recognition station or reader station is prepared to recognize idetifying devices of predetermined characteristics when such identifying device is brought within the proximity of the reader station. Inductive coupling takes place between the two devices when they are proximate to one another and it is not necessary to bring the device into physical contact. Though the identifying device may contain a battery, it usually receives its energy from the reader section.

Uses for such systems may include identification of person having identifying devices in their possession. For example, the identifying device may take the shape of a credit card and have an electronic circuit embedded therein for radiating signals of identifying intelligence. An individual possessing the card may position it adjacent a door that the individual desires to enter. A recognition device may be arranged to control the door latch and if it recognizes radiated signals of certain predetermined intelligence, the door latch responds to the reader when the individual places the "card" proximate to the reader. Other uses for such systems include having the identifier in the form of a tag attached to a vehicle to be identified. As the vehicle passes a certain location, its identification is recognized and recorded. Also, in production lines, garments or other items may carry identifying tags so that they can be appropriately processed as they are recognized along various points in the production processes.

The prior art includes various patents and patent applications by the present inventor. The patents include U.S. Pat No. 3,752,960 for "Electronic Identification and Recognition System," issued Aug. 14, 1973; U.S. Pat. No. 3,816,708 for "Electronic Recognition and Identification System," issued June 11, 1974; U.S. . No. 3,816,709 for "Electronic Identification and REcognition System," issued June 11, 1974; U.S. Pat. No. 4,223,830 for "Identification System," issued Sept, 23, 1980; U.S. Pat. No. 4,236,068 for "Personal Identification and Signalling System," issued Nov. 25, 1980; U.S. Pat. No. 4,384,288 for "Portable Radio Frequency Emitting Identifier," issued May 17, 1983; U.S. Pat. No. 4,388,524 for "Electronic Identification and Recognition with Code Changeable Reactance," issued June 14, 1983; U.S. Pat. No. 4,459,474 for "Identification System with Separation and Direction Capability and Improved Noise Reduction"; U.S. Pat. No. 4,473,825 for "Electronic Identification System with Power Input-Output Interlock and Increased Capabilities", issued Mar. 30, 1984; U.S. Pat. No. 4,546,241 for "Identification System with Synchronous Modulation of Return Signal", issued Dec. 10, 1982; U.S. Pat. No. 4,580,041 for "Electronic Proximity Identification System with Low Power Identifier, Simplified"; U.S. Pat. No. 4,600,829 for "Electronic Proximity Identification and Recognition System with Isolated Two-Way Coupling", issued on July 15, 1986; and U.S. patent application Ser. No. 06/637,546 for "Identification System with Vector Phase Angle Detection", filed on Aug. 3, 1984.

In the typical prior art systems, the reader section emits flux vertically from a single horizontal coil antenna. In the case of a vehicle identification system, the reader coil antenna is buried beneath the road surface. The identifier section has its own identifier antenna. In operation, the identifier section is positioned such that the identifier antenna is parallel to the reader coil antenna such that the identifier section antenna is penetrated by vertical flux lines from the reader antenna. Such systems of the prior art have some problems when the identifier section is attached to an object. For example, if the identifier section is located next to a metal vehicle body or undercarriage or ship's surface, there is interference with the vertical path of the flux. A large portion of the flux which rises vertically from the reader antenna cannot penetrate the identifier antenna resulting in loss of range and reliability.

Figure 1:
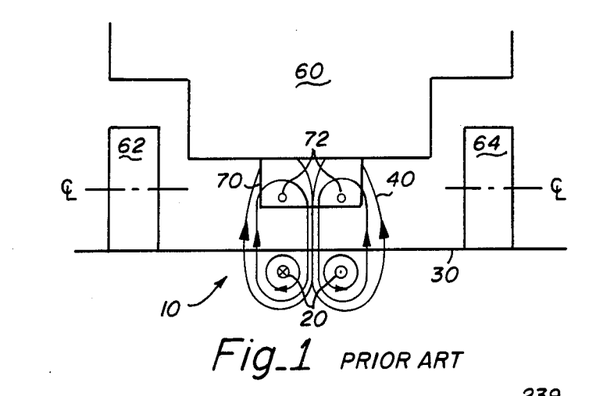
FIG. 1 is an end cross-sectional view of an application of an identifier system of the prior art as previously discussed.

FIG. 1 is an end cross-sectional view of the prior art electronic proximity identification system used with a vehicle and is referred to by the general reference number 10. A reader antenna 20 is buried under a road surface 30. The antenna 20 is positioned parallel with a surface 30. The circle with a dot represents current flowing through antenna 20 in a direction out of the paper, and the circle with the X inside represents current flowing through antenna 20 in a direction into the paper. Using the right-hand rule, the flux field generated has flow lines 40.

A vehicle 60 with tires 62 and 64 passes over road surface 30 with an identifier section 70 attached beneath the underside of vehicle 60. The flux lines 40 flow up through an identifier antenna 72. However, the bottom of the vehicle 60 blocks some of the flux lines 40. This reduces range and reliability of the identifier section.

One solution to the problem is to position the identifier antenna far enough away from the interfering metal surface so that more of the vertical flux lines can penetrate the identifier antenna. Locating the identifier antenna farther away from the object increases the likelihood that it will be damaged, and also makes it more expensive to mount the identifier section to the object.

Another problem with the prior art identification systems occurs at higher frequencies. High frequencies are desirable for minimizing the number of turns required in the identifier antenna. At higher frequencies, the wavelengths of the radio signal can be such that standing wave effects occur. This can interfere with the transmission of identification data from the identifier section to the reader section.

Still another problem with prior art identification systems involves radio interference. In electronic identification systems, it is necessary that the Federal Communications Commission give its approval, since there is a risk that such identification systems will cause interference to radio frequency communications. To meet FCC requirements, identification systems operate at either very low powers, or on certain allowed frequencies, or with antennas of minimum long distance radiation. The present invention avoids harmful far field radiation through self neutralizing antenna design, in a manner to be described below.

SUMMARY OF THE PRESENT INVENTION

It is therefore an object of the present invention to provide an electronic proximity identification system where the identifier section can be attached to an object without a reduction in range or reliability.

It is another object of the present invention to provide an electronic proximity identification system with a reader section which provides lateral flux to an identifier section.

It is a further object of the present invention to provide an electronic proximity identification system which eliminates the problem of standing waves at higher frequencies.

It is another object of the present invention to provide an electronic proximity identification system which radiates little or no power to other communication systems, yet has sufficient power at short distances to read the desired identifier sections.

Briefly, in a preferred embodiment, the present invention includes a reader section comprised of a reader circuit and a reader antenna comprised of a pair of coil loops. The coil loops are located in the same horizontal ground plane. Each coil is located directly beside its coil pair mate on a coil pair line. An identifier section line of travel is located between the coils and perpendicular to the coil pair line.

The reader antenna is connected to a reader circuit. The reader circuit supplies power to the reader antenna. The reader antenna is connected to the reader circuit such that currents flowing through the inner side of each coil which are closest to its coil mate pair are always flowing in the same direction. The flux radiated from the reader antenna flows first vertically and then laterally, parallel with and above and below the horizontal ground plane from one coil to the other, left to right or right to left. The flux flow is parallel to the coil pair line.

An identifier section is attached to an object to be identified. The identifier section has an identifier antenna which is comprised of a ferrite rod. The axis of the ferrite rod is positioned such that it is parallel to the line of flux flow between the coils. The flux lines flow horizontally.

The identifier antenna is connected to an identifier circuit. The identifier circuit is powered by the power radiated by the reader antenna. The identifier circuit contains a memory system which emits a string of identification bits which are converted to and radiated as an electromagnetic signal by the identifier antenna to the reader antenna. The reader antenna receives the signal and a detector in the reader circuit reads the information contained in the signal. The operation of the reader and identifier circuits are described in the referenced prior art.

It is therefore an advantage of the present invention that it provides an electronic proximity identification system where the identifier section can be attached to an object without a reduction in range or reliability.

It is another advantage of the present invention in that it provides an electronic proximity identification system with a reader section which provides lateral flux to an identifier section.

It is a further advantage of the present invention in that it provides an electronic proximity identification system which eliminates the problems of standing waves at high frequencies.

It is a further advantage of the present invention in that it provides an electronic proximity identification system which radiates little or no power to other communication systems, yet has sufficient power at short distances to read the desired identifier section.

These and other objects and advantages of the present invention will no doubt become obvious to those of ordinary skill in the art after having read the following detailed description of the preferred embodiments which are illustrated in the various drawing figures.

IN THE DRAWING

FIG. 6 is an end cross-sectional view of the present invention applied to a license plate;

DETAILED DESCRIPTION OF THE PREFERRED EMBODIMENT

Figure 2:
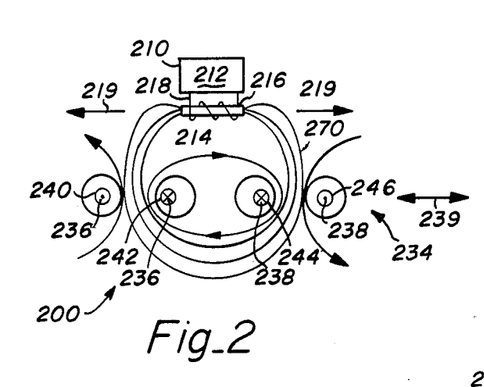
FIG. 2 is an end cross-sectional view of an identification system in accordance with the present invention.

FIG. 2 shows an end view of a basic embodiment of the present invention and referred to by the general reference number 200. An identifier section 210 is comprised of an identifier circuit 212 and an identifier antenna 214. The identifier circuit 212 can be one of various identifier circuits disclosed in the referenced patents. The identifier antenna 214 is a magnetic antenna rod 216, typically made of ferrite material and is wrapped with wire turns 218. Rod 216 has a rod axis 219.

A reader antenna 234 is comprised of a pair of coils 236 and 238 which are positioned in a horizontal plane along a coil pair line 239. Coil 236 has a pair of lines 240 and 242 running perpendicular to line 239. Coil 238 has a pair of lines 244 and 246 running perpendicular to line 239.

The identifier section is in some instances referred to as the identifier. The reader circuits are in some instances referred to as the reader block diagram.

Figure 3:
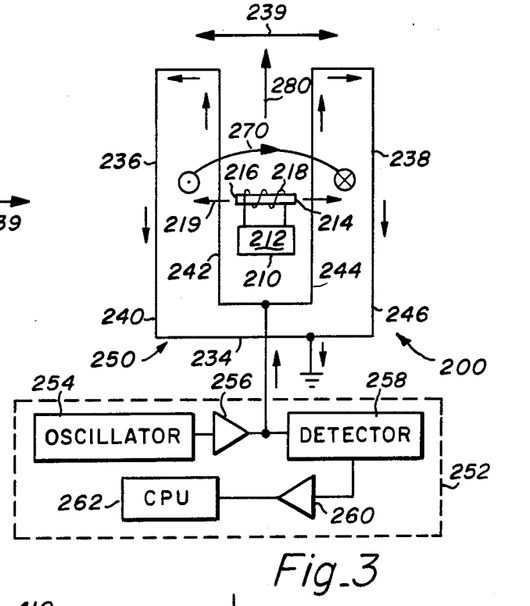
FIG. 3 is a plan view and block diagram of the identification system of FIG. 2.

FIG. 3 is a plan view of the reader antenna 234 described in FIG. 2 and a block diagram of a reader circuit. A reader section 250 is comprised of reader antenna 234 and a reader circuit 252. Reader circuit 252 has an oscillator 254, operating at a fixed frequency. The signal from oscillator 254 is amplified by amplifier 256 and is applied to reader antenna 234. Reader antenna 234 is inductively coupled to identifier antenna 214.

The identifier section, in response to the inductive coupling, sends a unique identifier code signal to the reader section 250. The reader circuit 252 has a detector 258 which is connected to reader antenna 234. The detector 258 detects the code signal sent by the identifier section and converts the code into a string of pulses. Detector 258 is described in the referenced prior art patents. The pulses are amplified by an amplifier 260 and are sent to a CPU 262. CPU 262 can then identify the identifier section by its unique code and take appropriate action, such as opening a barrier and recording the identification and time.

The antenna 234 is connected to reader circuit 252 such that the current (represented by arrows) is always flowing in the same direction for lines 242 and 244 on the inner sides of coils 236 and 238. The current returns in lines 240 and 246. A flux 270 is created which flows horizontally between coils 236 and 238 and above and below the plane of coils 236 and 238.

In operation, the identifier section 210 is positioned such that rod axis 219 is parallel to the path of flux 270. It may be desirable to have the reader section 250 read the identifier section 210 while the identifier section is in motion. In such a case, the identifier section 210 would move along a travel line 280 which is perpendicular to coil pair line 239. Coils 236 and 238 are elongated in a direction parallel to travel line 280. The elongation of the coils allows sustained reading of the identifier section 210 during passage of the object to be read along travl line 280.

Returning now to FIG. 2, the radiating flux lines 270 are shown at a moment in time when the flux from coil 236 is being emitted upwards or vertically. At the same moment in time, i.e., the same phase, coil 238 is driven with currents in the direction such that flux passes downward through coil 238. The resultant overall flux pattern is one in which there is a lateral flux, parallel to the horizontal plane containing the reader antenna 234, and above the plane, passing horizontally between the two coils, and returning below the plane of the reader section 230. The magnetic rod 216 provides a preferred lateral path for the flux between the two coils. The flux lines 270 change their direction in order to pass through the rod, giving the rod 216 a capture cross-section greater than that of an air-core loop. The lateral flux is not impeded as much as the prior art perpendicular flux by metal in a vehicle body, and the ferrite rod allows the identifier cross-section to be minimal.

Figure 10:
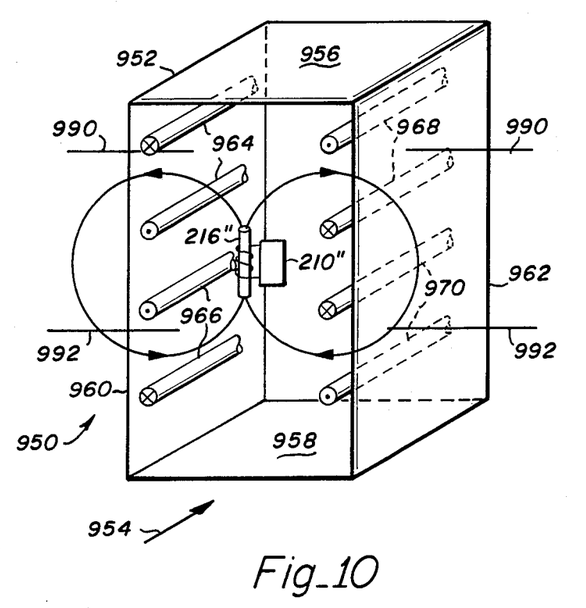
FIG. 10 is a perspective cross-sectional view of a passageway suitable for human identification.
Figure 11:
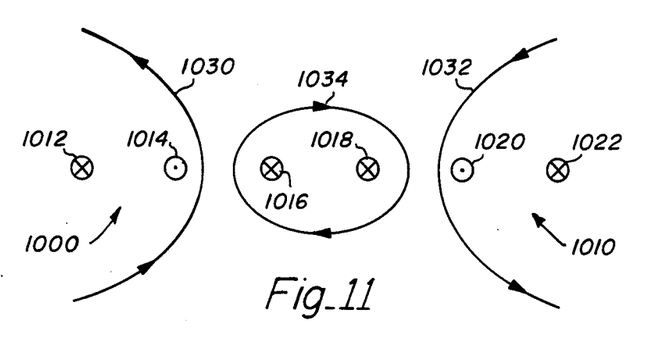
FIG. 11 is an end cross-sectional view showing added conductors to reduce far field radiation.

The present invention also has the advantage of reducing far field radiation to a minimal or zero amount. The antenna pairs have a net zero field at distances of several diameters. The two coils create radio frequency fields of opposing polarities. Thus, although there is an intense field near the coils, at distances exceeding several coil diameters, the field falls rapidly to zero. Thus, FCC approval can be readily attained. Further, FIGS. 10 and 11 show means for further far field radiation reduction.

Figure 4:
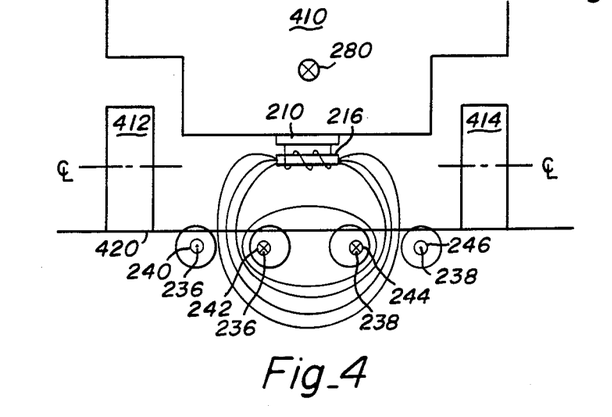
FIG. 4 is an end cross-sectional view of an embodiment of the present invention applied to a vehicle.

FIG. 4 is an end cross-sectional view of an application of identification system 200. The identifier section 210 is shown mounted to the underside of a vehicle 410 with tires 412 and 414. The reader antenna lines 240, 242, 244 and 246 of reader antenna 234 are buried below road surface 420. The coil lines are in the same horizontal plane beneath the road surface 420.

The magnetic rod 216 is mounted beneath the vehicle frame or on a license plate. The flux passes horizontally through the rod. The identifier circuit 212 is energized, clocks through its data, modulates the field, and the reader circuit 252 reads the contents of the identifier system memory. The method of reading is described in the referenced prior art patents. Each identifier section has its own unique code. The metal bottom of the vehicle 410 causes some of the horizontal flux to bypass the magnetic rod 216 which is made of ferrite. Ferrite, however, is more efficient at passing the radio frequency flux than is the sheet metal of the underbody of the vehicle 210, so most of the flux passes through the rod 216. The rod 216 is made as long as practical to gather the optimum amount of flux.

Figure 5:
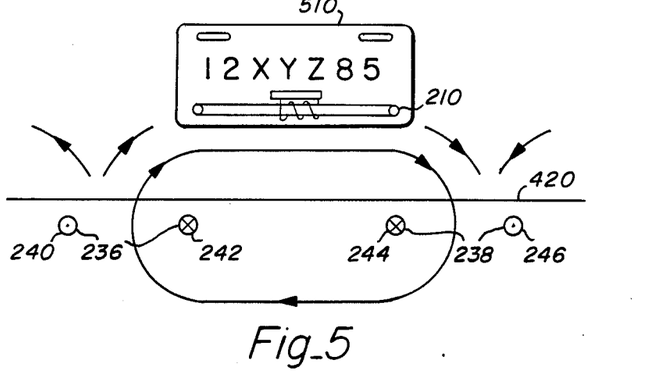

FIG. 5 shows an end cross-sectional view of a practical way to mount the identifier section 210 on a vehicle. The identifier section 210 is attached to the bottom of the inside edge of the license plate 510. The reader antenna coils 236 and 238 are shown mounted below the surface of the road bed 420. Surface mounting of coils 236 and 238 between the vehicle tire tracks is an option.

The identifier section 210 can be mounted to any type of vehicle. For example, the identifier section 210 can be attached to individual railroad cars to allow identification of each car. In a railroad application, the reader antenna coils 236 and 238 could be partly comprised of the railroad tracks. For example, the railroad tracks could be used as lines 242 and 244 and additional lines 240 and 246 could be added along side the track or lines 240 and 246 could be the railroad tracks and lines 242 and 244 could be added between the tracks. The railroad tracks would make good coil lines because large conductors produce the largest outward throw of the lateral flux lines.

Figure 6:
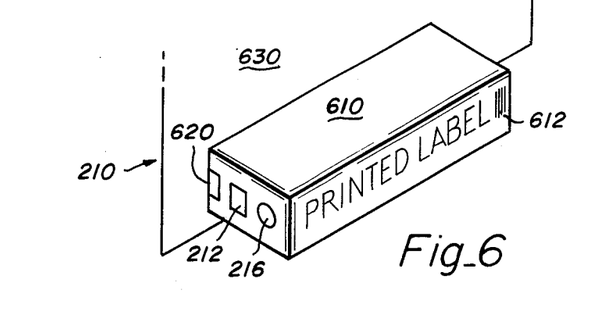
FIG. 6 is a perspective view of an identification section housing.

FIG. 6 shows a configuration of the identifier 210 which is suitable for attachment to a variety of items, such as a production line item or cattle. The assembly is encapsulated in a plastic rectangular bar 610, which includes on one surface written identification, which includes a bar code 612, and on the back surface, some fastening means 620, such as velcro, buttons, pins, bolts, rivets, or a collar. The identifier section 210 is attached to the object to be identified 630 such that the antenna rod 216 is parallel with the flux lines.

Figure 7:
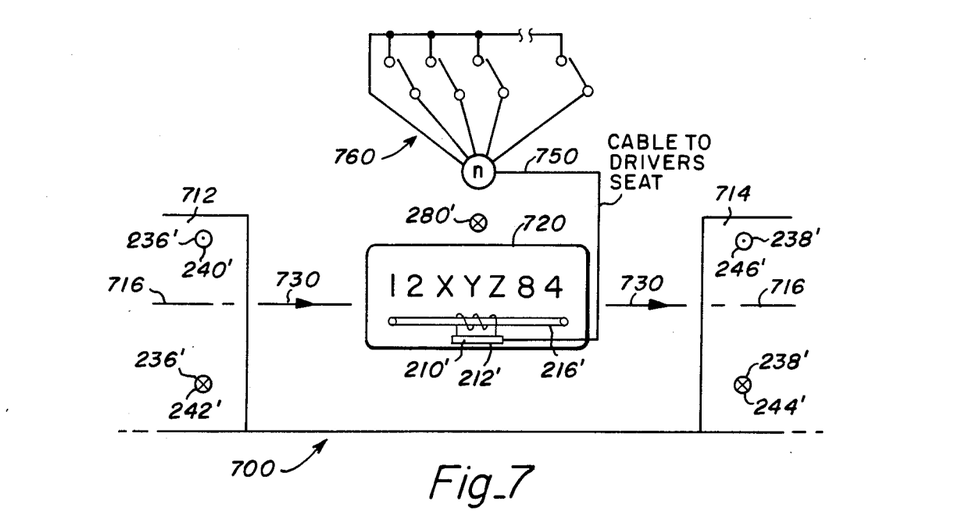
FIG. 7 is an end cross-sectional view of the present invention showing data modification capability.

FIG. 7 shows an alternative embodiment of the identification system of the present invention and is referred to by the general reference number 700. Elements of FIG. 7 which are similar to FIGS. 2 and 3 carry the same reference numeral distinguished by a prime designation. The coils 236' and 238' are positioned vertically in two separate and parallel vertical planes. The coils 236' and 238' are mounted in panels 712 and 714, respectively. The coils 236' and 238' face each other and are located with their axis along a line 716 which is perpendicular to both vertical planes. Passage of identifier section 210' and the object to which it is attached is between coils 236' and 238'. Identifier section 210' is shown ( attached to a license plate 720 of a vehicle. Coils 236' and 238' transmit lateral flux lines such as flux line 730, which pass through rod 216' of identifier section 210'.

An additional feature allows a driver to change the code of the identifier section. A cable 750 containing "n" number of conductors is connected to the identifier circuit 212'. The cable 750 runs from the license plate 720 to a driver's position in a vehicle to which the license plate 720 is mounted. A switching station 760 comprising "n−1" number of switches is connected to cable 750. The switching station 760 allows the driver to insert changeable codes containing additional data into the identifier circuit 212'. Identifier sections with changeable code are shown in the referenced prior art patents. The changeable code feature would give the driver the ability to input a personal driver code and vehicle code or an emergency code or any other unique data.

Figure 8:
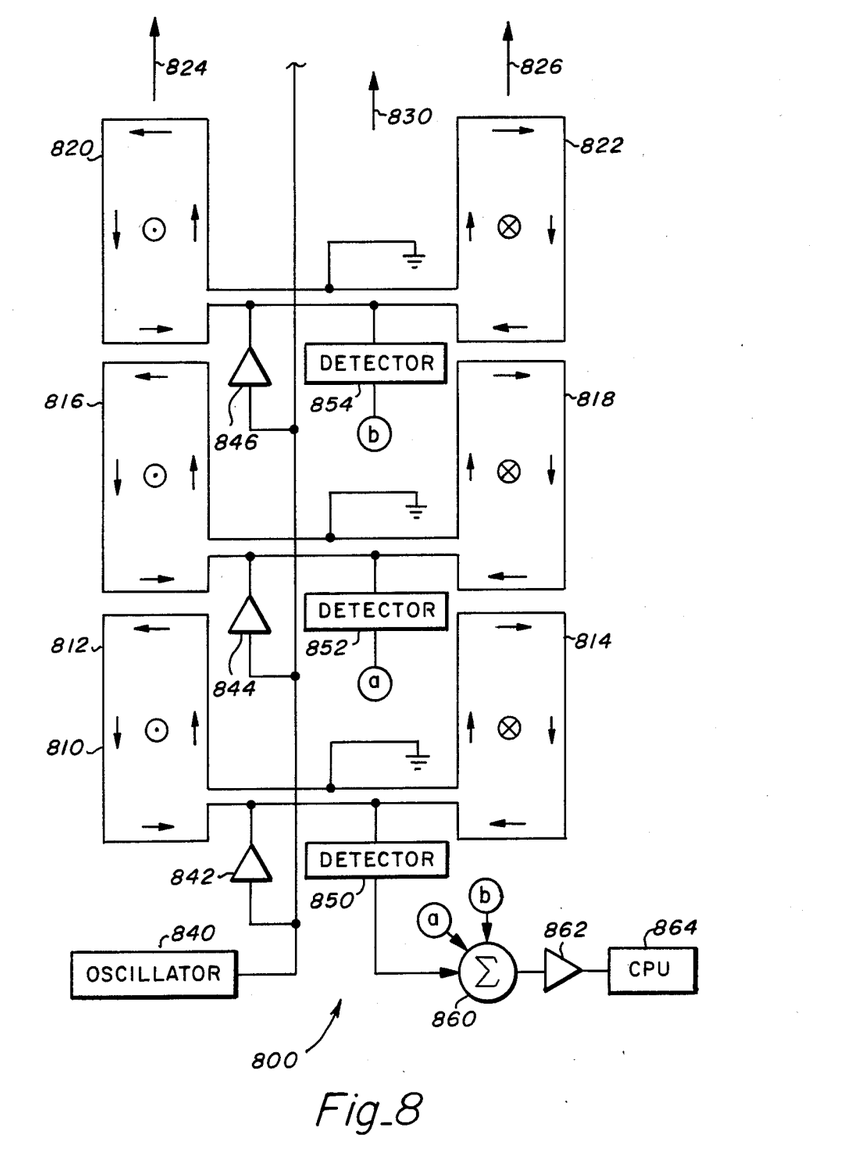
FIG. 8 is a plan view and block diagram of a multiple antenna system of the present invention.

FIG. 8 shows an alternative embodiment of the reader section of the present invention and is referred to by the general reference number 800. FIG. 8 is a multiple antenna system of the identifier system of FIG. 3. One of the preferred frequencies of the identification system is 13.56 MHz, and at this frequency, for geometries larger than several feet, high impedances, low capacitances, and standing wave effects occur. A vehicle may cover the several feet containing the reader antenna coils in a time too brief to be readily identified. The identification system 800 solves these problems and allows measurement of the identifier section over lengthier portions of the road bed.

A reader antenna 810 is comprised of a pair of coils 812 and 814, a pair of coils 816 and 818, and a pair of coils 820 and 822. The coils 812, 814, 816, 818, 820 and 822 are located in the same horizontal ground plane with each coil located directly across from its mate pair. Coils 812, 816 and 820 lie in a first coil line 824. Coils 814, 818 and 822 lie in a second coil line 826 parallel to the first coil line 824. An identifier section line of travel 830 is parallel and between the first and second coil lines 824 and 826

The coil pairs 812 and 814, 816 and 818, and 820 and 822 are of small enough dimension that undesired standing wave effects do not occur in each coil pair. An oscillator 840 is connected to a driver amplifier 842, a driver amplifier 844, and a driver amplifier 846. Each driver amplifier is designed to have a constant current output, or relatively high output impedance, which minimizes interaction of the coils due to their mutual coupling. Driver amplifier 842 is connected to coil pair 812 and 814 such that current is always flowing in the same direction through the inner lines of the coils 812 and 814. Driver amplifier 844 and 846 are similarly connected to coil pair 816 and 818, 820 and 822, respectively. Coil pair 812 and 814 are connected to a detector 850. Coil pair 816 and 818 are connected to a detector 852. Coil pair 820 and 822 are connected to a detector 854. The outputs of detectors 850, 852 and 854 are summed at a summer 860 and are amplified by amplifier 862 to provide logic level output for a CPU 864.

The identification system 800 solves the problem of identifying objects traveling at high speeds by providing a plurality of reader antenna coils to allow multiple readings of the object as it passes. Another advantage of using multiple reader antennas is that it is more reliable in cases where the identifier section is powered by the reader antenna. In identifier sections moving at high speed, the identifier section is sometimes not completely powered up until it has passed the reader antenna. By having multiple reader antennas, the first reader antenna can power-up the identifier section and the later reader antennas can read the identifier section.

Figure 9:
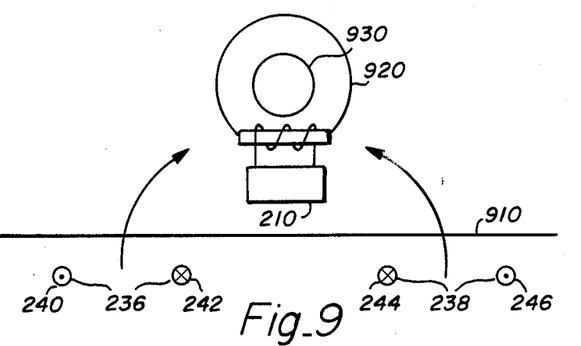
FIG. 9 is an end cross-sectional view of an embodiment of the present invention applied to livestock.

FIG. 9 shows an application of the identifier system 200 in the livestock industry. The coils 236 and 238 are positioned below a floor 910. The identifier section 210 is attached to a collar 920. The collar 920 is attached around the neck of a cow or other animal 930.

FIG. 10 shows a cross-sectional perspective view of an additional embodiment of the present invention and is referred to by the geneaal reference number 950. Elements of FIG. 10 which are similar to FIG. 2 carry the same reference number distinguished by a double prime designation.

The identification system 950 is designed for use in identifying individuals who pass through a passageway 952 in a direction 954. Passageway 954 has a top 956, a floor 958, a left wall 960, and a right wall 962. A pair of reader antenna coils 964 and 966 are attached coplanar with the left wall 960 such that the coils 964 and 966 are positioned in a vertical line. A second pair of reader antenna coils 968 and 970 are attached coplanar to the right wall 962 such that the coils 968 and 970 are in a vertical line. Coils 964 and 968 are located along a first coil axis 990 and coils 966 and 970 are located along a second coil axis 992. The current flows through the coils 964, 966, 968 and 970 such that a vertical flux is created in passageway 952.

In operation, an individual, would have an identifier section 210". The identifier section 210" could be made in the shape of a pen. This would help ensure that the axis of rod 216" would be vertical when the individual walked through the passageway 952. An advantage of having the rod 216" positioned vertically is that the individual could turn in any direction while in the passageway and the identifier section 210" could still be read. This solves prior problems of correct orientation which occurred when the identifier section 210" was located in a badge or card. The two sets of coils, one located in each wall, ensure that the flux field will remain strong along each wall of the passageway, so that the identifier section 210" can be read even if the individual walks close to the left or right walls 960 and 962. The resulting system 950 would only require the individual to wear the identifier section 210" as a pen in his pocket, and the individual would not have to use his hands or do anything other than walk through the passageway 952.

FIG. 11 shows an alternative embodiment of the invention for further reducing far field radiation and is designated by the general reference number 1000. As described in FIGS. 2 and 3, the flux from coils 236 and 238 substantially cancel each other at a distance of several antenna loop diameters above or below the coils. However, some of the flux on either side of the coils, fringe flux, is not cancelled. These fringes of flux, also known as lobes, or leakage flux, are detectable by radio receivers. Embodiment 1000 of FIG. 11 provides cancellation of fringe flux.

A reader antenna 1010 of FIG. 11 has coil lines 1012, 1014, 1016, 1018, 1020 and 1022. Lines 1014, 1016, 1018 and 1020 are similar to lines 240, 242, 244 and 246, respectively, of FIG. 2. Lines 1014 and 1020 produce fringe flux lines 1030 and 1032, respectively. Flux line 1034 is similar to flux line 270 of FIG. 2. Coil lines 1012 and 1022 act as compensating conductors and have current flows and consequent magnetomotive force (mmf.) in the direction that opposes the mmf. produced by fringe flux 1030 and 1032.

Figure 12:
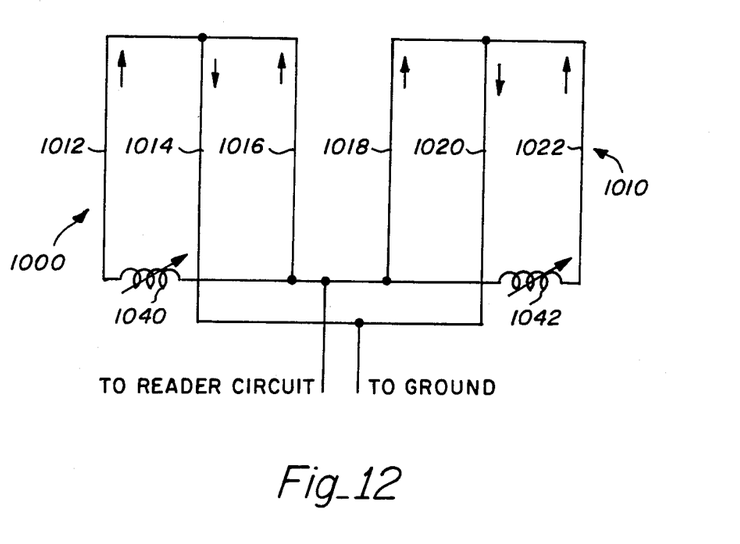
FIG. 12 is a plan view of FIG. 11.

FIG. 12 shows a plan view of embodiment 1000 of FIG. 11. Lines 1014, 1016, 1018 and 1020 are connected to a reader circuit (not shown) and ground similar to lines 240, 242, 244 and 246 of FIG. 2. An adjustable inductor 1040 is connected between the reader circuit and line 1012. Line 1012 is parallel to line 1014 and is connected between line 1014 and inductor 1040 such that the current flows through line 1012 in the opposite direction as the current flowing through line 1014. An adjustable inductor 1042 is connected between the reader circuit and line 1022. Line 1022 is parallel to line 1020 and is connected between line 1020 and inductor 1042 such that the current flows through line 1022 in the opposite direction as the current flowing through line 1020.

In operation, the current flows through reader antenna 1010 as shown by the arrows in FIG. 12. It is necessary to adjust the current in compensating conductor lines 1012 and 1022, to produce nearly perfect cancellation. The adjustment is achieved by adjustable inductors 1040 and 1042. Once compensated, the power level can be increased to produce an intense and effective field at the center for detection of the identifier, and yet have practically zero far field radiation.

Figure 13:
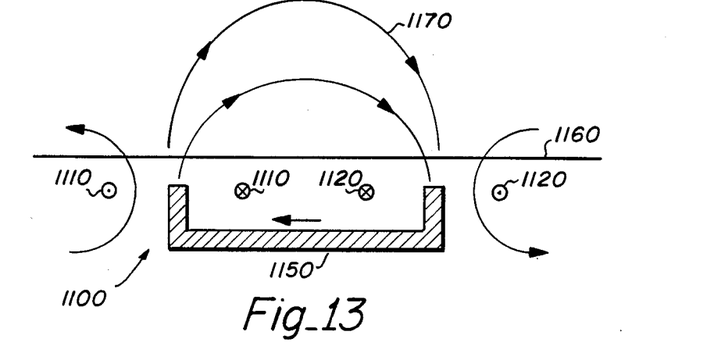
FIG. 13 is an end cross-sectional view of an embodiment of the present invention with an added flux path to enhance flux flow.

FIG. 13 shows the present invention with the addition of a flux path to enhance the flux radiation above ground and to reduce the radiation below ground and is designated by the general reference number 1100. The device 1100 has a reader antenna comprised of a pair of coils 1110 and 1120. Coils 1110 and 1120 are similar to coils 236 and 238 of FIG. 2. The reader antenna of device 1100 further includes a flux path 1150. Flux path 1150 is made of a ferrite rod. The flux path 1150 lies below a ground plane 1160 horizontally between coils 1110 and 1120. The ends of the flux path 1150 are bent so that they run vertically directly below the coils 1110 and 1120. In operation, flux lines such as 1170 are radiated upward above the ground plane 1160 and then follow the flux path 1150 below the reader plane 1160. The result is that less power is required for the same radiated flux and less total unwanted radiation occurs below the reader plane 1160. In contrast to the reader antenna of FIG. 2, which could be layed directly on top of the ground surface, the reader antenna of FIG. 13 would require that the flux path 1150 be located a distance of a few inches below the ground.

Figure 14:
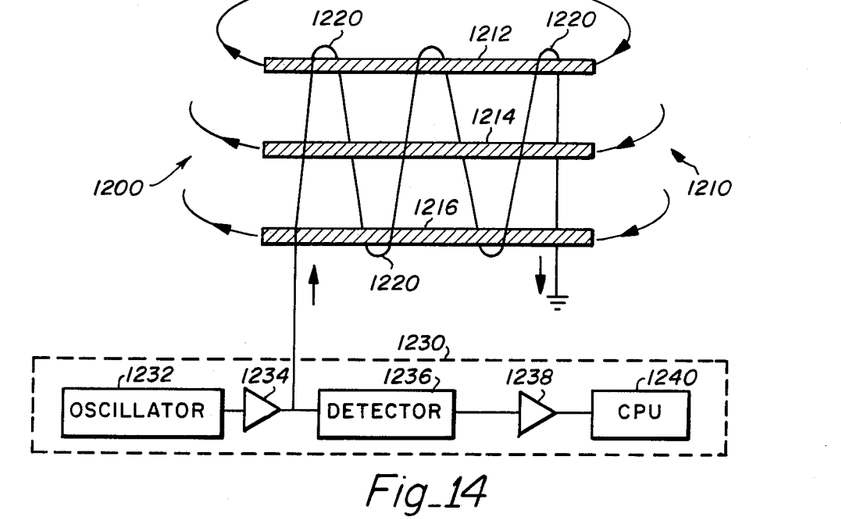
FIG. 14 is a plan view and block diagram of the present invention with a reader antenna having ferrite rods.

FIG. 14 shows another embodiment of the reader section of the present invention and is designated by the general reference number 1200. A reader antenna 1210 is comprised of ferrite rods 1212, 1214 and 1216. The ferrite rods 1212, 1214 and 1216 are wrapped with coil turns 1220. The reader antenna 1210 is connected to reader circuit 1230. Reader circuit 1230 is similar to reader circuit 252 of FIG. 3 and includes an oscillator 1232, an amplifier 1234, a detector 1236, an amplifier 1238, and a CPU 1240.

Figure 15:
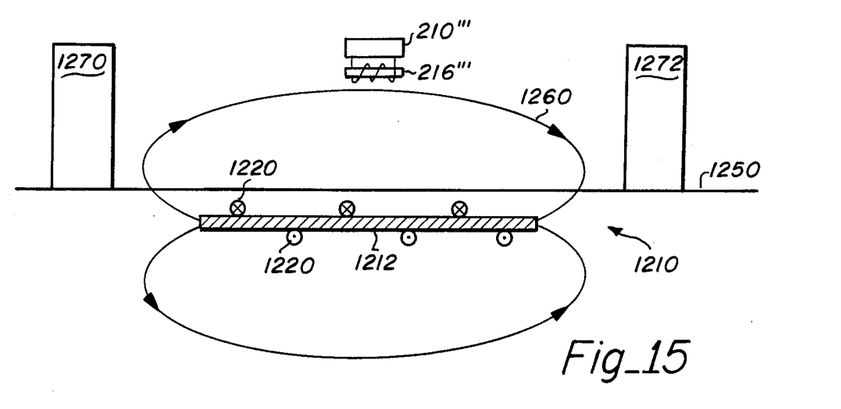
FIG. 15 is an end cross-sectional view of the structure of FIG. 14.

FIG. 15 is an end cross-sectional view of the device of FIG. 14. Elements of FIG. 15 which are similar to elements of FIG. 2 are referred to by a triple prime designation. The reader antenna 1200 is located below a ground plane 1250. The ferrite rods 1212, 1214 and 1216 are located parallel to each other in the same horizontal plane. When the reader antenna 1210 is energized by reader circuit 1230, flux lines, such as 1260, exit the left end of the rods 1212, 1214 and 1216, and flow around the rods and enter on the right-hand side of the rods.

The direction switches as the polarity switches. A vehicle, with tires 1270 and 1272 has an identifier section 210'''. The reader antenna 1210 generates a horiontal flux path, which includes flux line 1260. The magnetic rod 216''' of the identifier section 210''' is oriented on the vehicle such that it is parallel with the flux lines.

Additional variations in the present invention are possible. For example, a further pair of reader antennas may be placed at right angles to the first pair, and electrically excited at a ninety degree phase difference, or a different frequency, and the identifier section is then energized with any angular orientation. Both pair of antennas may be arranged as a square so that the identifier may pass the reader section at any angle.

Another variation of the present invention would be to use a central conductor for the reader antenna. In FIG. 4, it can be seen that the inner lines 242 and 244 carry current in the same direction. Some flux is lost at the center by local loops around the conductor constituting self inductance. This flux can be blocked and a small increase in performance achieved by combining the inner lines 242 and 244 into a single large plane of metal. A disadvantage to such a large plane of metal is electrical losses due to capacitance coupling to the ground. However, the capacitance value can be reduced, while still reducing self inductance, if the inner lines are formed with a grid of wires. The losses due to this large capacitance can also be minimized by making the large sheet the ground return.

Several factors determine the choice of the optimum frequency. One is that the standing wave effect is to be avoided. Another is to choose a radio frequency where there is the maximum difference in permeability between the ferrite rod and surrounding ferrous and metallic masses. The frequency of best discrimination differs for the ferrite materials selected and for the metallic structures encountered in the various applications.

Experiments have confirmed the advantages of the proximity identification system with lateral flux paths of the present invention as compared to coventional perpendicular flux sensing systems. It is possible with the present invention to have the ferrite rod of the identifier actually touching the sheet metal of an automobile, and yet still be sensed by the reader. The reason is that the flux path prefers traveling through the ferrite rod parallel to the metal surface, rather than flowing through the metal surface itself. Further, the ferrite rod identifier can be placed behind the bumper of an automobile, and several inches above the lowest surface of the vehicle, and the identifier data is still readable. This performance has not been possible with conventional perpendicular flux path sensing.

The structure of the present invention identifier can be hidden under the vehicle and protected by the vehicle underparts. As a consequence, the present invention identifier does not have to be as heavily constructed as those of the prior art. The prior art identifiers were sometimes nonmetallic domes on railroad cars and vehicles. However, the present invention need not be circular or rectangular, but can be a rod-like shape. These factors allow the identifier to be constructed at less cost and more easily installed than the prior art designs. The overall volume and costs of the identifier are therefore reduced.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A proximity identification system comprising:
an electronic reader section for reading inductively coupled electromagnetic coded flux signals, the reader section having a reader circuit connected to a reader antenna for supplying power to said reader antenna, said reader antenna including a pair of separate coils located proximate one another along a first coil pair line, said pair of coils both located in a reader plane and oriented with the electromagnetic flux paths being between the coils in a direction parallel to said first coil pair line, said flux paths located above and below said reader plane when said coils are energized by power from said reader circuit, said reader coils are connected to said reader circuit such that, for any time phase, if the current in one of the coils is flowing in a clockwise direction, then the current in the other coil is flowing in a counter clockwise direction; and
an identifier section detached from the reader section and movable relative to the reader section, the identifier section having an identifier circuit for storing and transmitting multiple bits of information, said identifier circuit being connected to an identifier antenna, said identifier antenna being oriented with its axis parallel to, and intersecting said flux from said reader section whereby the identifier section is powered by power radiated by said reader antenna.

2. The system of claim 1 wherein,
the identifier section is mounted in a collar and is attached around the neck of livestock.

3. The system of claim 1 wherein,
said reader circuit is comprised of an oscillator connected to said reader antenna to provide a power supply for radiating power from said reader antenna, a power amplifier connected intermediate said oscillator and said reader antenna, and a detector connected to said reader antenna for detecting changes in the voltage across said reader antenna and for delivering output signals responsive to said changes.

4. The system of claim 1 wherein,
said identifier antenna is comprised of a magnetic rod.

5. The system of claim 4 wherein,
said magnetic rod is made of ferrite.

6. The system of claim 1 wherein,
said reader antenna is placed in a road bed, and the reader antenna coils are elongated in the direction of travel of a vehicle to be identified.

7. The system of claim 1 wherein,
the identifier section is mounted beneath a vehicle such that said identifier antenna has a horizontal axis.

8. The system of claim 7 wherein,
the identifier section is connected by a cable to a switching station located near a driver of said vehicle, such that the driver can select an identifier code for the identifier section.

9. The system of claim 1 wherein,
one side of each reader antenna coil is comprised of one rail of a railroad track.

10. The system of claim 1 wherein,
the identifier section having means for attachment to a license plate of a vehicle.

11. The system of claim 1 wherein,
the identifier section is enclosed in a plastic housing, the plastic housing having attachment means such that the identifier section can be attached to a variety of objects.

12. The system of claim 1 wherein,
the reader antenna has at least one additional pair of reader antenna coils with all said coils connected to said reader circuit and located in the same reader plane, each additional coil pair located along its own coil pair line such that all additional coil pair lines are parallel to said first coil pair line, a first coil of each coil pair located along a first coil line and a second coil of each coil pair located along a second coil line, said first and second coil lines perpendicular to said first coil pair line, with each coil pair radiating flux in a direction parallel to said first coil pair line when energized by power from said reader circuit.

13. The system of claim 1 wherein,
the reader antenna further includes a pair of compensating conductor lines located in said reader plane, a conductor line positioned on each side of said pair of coils, a first conductor line connected intermediate a first coil of said coil pair and said reader circuit, a second conductor line connected intermediate a second coil and said reader circuit, such that the fringe flux radiation from the sides of the coil pair is cancelled by flux radiation from said pair of compensating conductor lines when said coils and said pair of compensating conductor lines are energized by power from said reader circuit.

14. The system of claim 13 wherein,
the reader antenna further includes a pair of adjustable inductors, a first inductor connected between said reader circuit and said first conductor line and a second inductor connected between said reader circuit and said second conductor line, such that the flux from said conductor lines can be adjusted.

15. The system of claim 1 wherein,
the reader antenna further includes a magnetic rod flux return path located below said reader plane between said coils for enhancing the flux radiation above said reader plane and for reducing the flux radiation below said reader plane.

16. The system of claim 15 wherein,
said magnetic rod flux return path is made of ferrite.

17. A proximity identification system comprising:
an electronic reader section for reading inductively coupled electromagnetic coded flux signals, the reader section having a reader circuit connected to a reader antenna for supplying power to said reader antenna, said reader antenna including a pair of separate coils located along a first coil axis with a space between the coils to allow for passage of an object to be identified, said coils being oriented with the electromagnetic flux travel path being between the coils in a direction parallel to said coil axis when both of said coils are energized by power from said reader circuit, said reader antenna coils are connected to said reader circuit such that the current flows in the same direction in portions of each loop located along lines parallel to said coil axis; and
an identifier section detached from the reader section and movable relative to the reader section, the identifier section having an identifier circuit for storing and transmitting multiple bits of information, said identifier circuit being connected to an identifier antenna, said identifier antenna being mounted with an identifier antenna axis parallel to said coil axis whereby the identifier section is powered by power radiated by said reader antenna.

18. The system of claim 17 wherein,
the reader circuit is comprised of an oscillator connected to said reader antenna to provide a power supply for radiating power from said reader antenna, a power amplifier connected intermediate said oscillator and said reader antenna, and a detector connected to said reader antenna for detecting changes in the voltage across said reader antenna and for delivering output signals responsive to said changes.

19. The system of claim 17 wherein,
said reader antenna has at least one additional pair of reader antenna coils connected to said reader circuit and with the coil axis of each pair being parallel to and located in the same plane as each other coil axis.

20. A proximity identification system comprising:
an electronic reader section for reading inductively coupled electromagnetic coded flux signals, the reader section having a reader circuit connected to a reader antenna for supplying power to said reader antenna, said reader antenna having a first pair of separate coils located in a first plane along a first coil pair line and a second pair of separate coils located in a second plane along a second coil pair line parallel to said first coil pair line, said second plane being a distance from and parallel to said first plane, a first coil of each coil pair located along a first axis line and a second coil of each coil pair located along a second axis line, said first and second axis lines being perpendicular to said first and second plane, said coils connected to said reader circuit with the electromagnetic flux path between the coil pairs in a direction parallel to said first and second coil pair lines and said flux path is located between said first and second planes, the reader antenna is connected to said reader circuit such that, for any time phase, if the current in a first of said coils is flowing in a clockwise direction, then the current is flowing in a counterclockwise direction in the coils located along the same coil pair line and the same axis line as the first mentioned coil; and
an identifier section detached from the reader section and movable relative to the reader section, the identifier section having an identifier circuit for storing and transmitting multiple bits of information, said identifier circuit being connected to an identifier antenna, said identifier antenna being mounted with an axis of the identifier antena parallel to said flux travel path whereby the identifier section is powered by power radiated by said reader antenna.

21. The system of claim 20 wherein,
the identifier section is enclosed in a pen-shaped instrument.

22. A proximity identification system comprising:
an electronic reader section for reading inductively coupled electromagnetic coded flux signals, the reader section having a reader circuit connected to a reader antenna for supplying power to said reader antenna and for detecting a modulated identifier signal, said reader antenna comprised of a magnetic rod located in a reader plane, said magnetic rod wound with turns of wire such that when said reader antenna is energized by application of a voltage at radio frequencies from said reader circuit, the flux paths are in a direction parallel to said magnetic rod, and said flux paths are located on either side of said reader plane; and
an identifier section detached from the reader section and movable relative to the reader section, the identifier section having an identifier circuit for storing and transmitting multiple bits of information as said modulated identifier signal, said identifier circuit being connected to an identifier antenna, said identifier antenna being oriented with its axis parallel to and intercepting said flux from said reader section.

23. The system of claim 22 wherein,
the reader antenna has at least one additional magnetic rod, all of said magnetic rods being located in said reader plane parallel to one another, and all of said magnetic rods wound with the same wire turns.

24. The system of claim 22 wherein,
said magnetic rod is made of ferrite.

25. The system of claim 22 wherein,
said identifier antenna is a magnetic rod.

26. The system of claim 25 wherein,
said identifier antenna is mounted to a vehicle license plate.

27. The system of claim 25 wherein,
said identifier antenna is comprised of a ferrite rod.

28. The system of claim 22 wherein,
said reader antenna is located between the wheel paths of a vehicle line of travel.

* * * * *